(12) United States Patent
Pernot et al.

(10) Patent No.: US 12,728,675 B2
(45) Date of Patent: Sep. 8, 2026

(54) ELECTRONIC MEMBER TRANSMITTING AN ITEM OF IDENTIFICATION INFORMATION DURING A STATE CHANGE

(71) Applicant: COMPAGNIE GENERALE DES ETABLISSEMENTS MICHELIN, Clermont-Ferrand (FR)

(72) Inventors: Alexandre Pernot, Clermont-Ferrand (FR); Denis Martin, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 204 days.

(21) Appl. No.: 18/267,963

(22) PCT Filed: Dec. 3, 2021

(86) PCT No.: PCT/FR2021/052194

§ 371 (c)(1),
(2) Date: Jun. 16, 2023

(87) PCT Pub. No.: WO2022/136757

PCT Pub. Date: Jun. 30, 2022

(65) Prior Publication Data

US 2024/0042811 A1 Feb. 8, 2024

(30) Foreign Application Priority Data

Dec. 22, 2020 (FR) ...................................... 2013931

(51) Int. Cl.
*B60C 23/04* (2006.01)
*B60C 19/00* (2006.01)

(52) U.S. Cl.
CPC ...... *B60C 23/0459* (2013.01); *B60C 23/0488* (2013.01); *B60C 2019/004* (2013.01)

(58) Field of Classification Search
CPC ..... B60C 11/243; B60C 11/246; B60C 23/04; B60C 23/0411; B60C 23/064;
(Continued)

(56) References Cited

U.S. PATENT DOCUMENTS 6,998,973 B2 * 2/2006 Lefaure ............... B60C 23/0464 73/146.2
7,228,210 B2 * 6/2007 Davis ..................... G07C 5/008 701/32.4

(Continued)

FOREIGN PATENT DOCUMENTS

DE 10 2008 014 537 A1 9/2009
EP 3741588 A1 11/2020

(Continued)

OTHER PUBLICATIONS

International Search Report dated Mar. 31, 2022, in corresponding PCT/FR2021/052194 (5 pages).

*Primary Examiner* — Stephen R Burgdorf
(74) *Attorney, Agent, or Firm* — VENABLE LLP

(57) ABSTRACT

An electronic member comprises: a movement sensor and/or a proximity sensor; a microprocessor coupled to the sensor to form a data signal; a storage area connected to the microprocessor for storing a part of the data signal and an identification information element; an energy source; and a radio transmitter connected to the microprocessor The microprocessor is capable of defining two states of the electronic member, the storage area contains a predetermined change of state which is defined on the basis of the two states, the microprocessor is capable, having detected the predetermined change of state, of transmitting the identification information element via a radiofrequency signal transmitted during a time interval ΔT and then stopping the transmission of the radiofrequency signal at the end of the
(Continued)

time interval ΔT and the time interval ΔT is between 20 seconds and 10 minutes.

12 Claims, 4 Drawing Sheets

(58) Field of Classification Search
CPC ... B60C 23/065; B60C 23/408; B60C 23/416; B60C 23/452; B60C 23/0459; B60C 23/471; B60C 23/488; B60C 23/489; B60C 23/493; B60C 2019/004; G01C 22/00; G05D 1/0287; G06K 19/07; G07B 15/063
USPC .......................................................... 340/438
See application file for complete search history.

(56) References Cited

U.S. PATENT DOCUMENTS 7,810,387 B2 10/2010 Robert
10,858,009 B2* 12/2020 Sekizawa ................ B60C 19/00
11,551,493 B2 1/2023 Canioncq et al.
2002/0078741 A1* 6/2002 Cantu ..................... B60C 23/04 73/146
2002/0095980 A1* 7/2002 Breed .................. B60N 2/0276 73/146
2002/0126005 A1 9/2002 Hardman et al.
2007/0095446 A1* 5/2007 Mancosu ............ B60C 23/0459 73/146
2007/0274030 A1 11/2007 Robert
2008/0030314 A1* 2/2008 Watabe ............... B60C 23/0459 340/447
2017/0050478 A1 2/2017 Ijima et al.
2017/0320363 A1* 11/2017 Hung .................. B60C 23/0486
2018/0065156 A1* 3/2018 Winkle ................... B07C 5/342
2019/0143987 A1 5/2019 Sekizawa et al.
2020/0031183 A1* 1/2020 Kim ...................... B60C 11/243
2020/0372730 A1 11/2020 Canioncq et al.
2021/0209869 A1* 7/2021 Kremmer ................. G07C 5/02
2021/0247171 A1* 8/2021 Guinart ................... G01P 15/09

FOREIGN PATENT DOCUMENTS

FR 2901422 A1 11/2007
WO 2015/115581 A1 8/2015

* cited by examiner

ELECTRONIC MEMBER TRANSMITTING AN ITEM OF IDENTIFICATION INFORMATION DURING A STATE CHANGE

FIELD OF THE INVENTION

The present invention relates to an electronic member subjected to a movement or sensitive to the proximity of an object or of a source, intended for example to be incorporated in a mounted assembly, for the purpose of transmitting an identification information element, for example the identity of the components of the mounted assembly, when the electronic member is caused to move, or when a degree of proximity to other objects or to a source has been reached.

TECHNOLOGICAL BACKGROUND

A knowledge of the identity of the components of the mounted assembly the objects of a system is essential for the adaptation of the devices, notably the electronic devices, of the system such as driver assistance tools for motor vehicles. This is because these device are sensitive to the technical characteristics of the components, particularly those of the tyre casing for the example of driver assistance tools. This component, like the tyre casing, is required to undergo modification over time or to be changed during the use of the system, and it is therefore important to have regular access to the identity of the component, particularly that of the tyre casing, which is the element in direct contact with the road in the particular case of motor vehicles.

At the present time, in the case of mounted assemblies, the identification function may be provided electronically, for example by means of an RFID (Radio Frequency IDentification) tag incorporated in the mounted assembly. An example of an RFID tag applicable to the tyre casing is illustrated in the publication FR2901422A1. This RFID tag is a passive electronic member which receives a radiofrequency interrogation signal from a reader outside the mounted assembly. The energy of the interrogation signal is used to supply the electronic member and to send a radiofrequency return signal containing the information about the identity of the tyre casing, for example. Thus the information is in response to a command received by the user who activates the radiofrequency reader.

Because of the characteristics of the elastomer blends of the tyre casing, and in order to facilitate the integration of the RFID tag into the tyre casing, it is common practice to use the frequency band in the vicinity of 900 MHz that corresponds to the best compromise between a small size of the radiofrequency antenna, which preserves the physical integrity of the RFID tag, and a good quality of the radiofrequency return signal.

However, the RFID tag is usually read when the tyre casing is static, that is to say stationary or pseudo-stationary, in order to optimize the energy transmission to the RFID tag. Furthermore, the transmission of the radio waves is governed by specific transmission standards which limit the transmission power, thereby reducing the reading distances of the RFID tags. Therefore, if it is desired to identify the four mounted assemblies of the vehicle on the basis of the vehicle structure itself, the number of readers must be multiplied, preferably using one reader for each axle of the vehicle, or at least one reader for each mounted assembly. Thus such a device does not meet the requirements of industrialization for the vehicle, owing to the constraints on the installation of the radiocommunication system and on the desired automation of the function of providing information on the mounted assembly.

The object of the present invention is to define an electronic member for transmitting an identification information element on the occurrence of an event such as a change of state of the electronic member, particularly for the mounted assembly, at particular moments such as the moment when the mounted assembly of the vehicle is caused to rotate so as to provide the best control of the electronic devices of the system such as a vehicle that are dependent on the characteristics of the mounted assembly. The system around this member must also be competitive in economic and industrial terms. The present invention is therefore intended to resolve all the problems of the ordinary RFID tag, while remaining reliable during the life of the component in the system.

SUMMARY OF THE INVENTION

The invention relates to a first object which is an electronic member, comprising:

- At least one movement sensor whose signal is sensitive to the movement of the electronic member and/or at least one proximity sensor whose signal is sensitive to the distance of said sensor from an object outside the electronic member;
- A microprocessor coupled to the at least one movement sensor and/or to the at least one proximity sensor to create a data signal;
- A storage area connected to the microprocessor for storing, on the one hand, at least a part of the data signal representative of the at least one sensor, and, on the other hand, at least one identification information element;
- An energy source; and
- A radio transmitter coupled to the microprocessor.

The electronic member is characterized in that the microprocessor is capable of defining at least two states of the electronic member on the basis of the at least one part of the data signal, in that the storage area contains at least one predetermined change of state which is defined on the basis of the at least two states of the electronic member and in that the microprocessor is capable, when the microprocessor has detected the at least one predetermined change of state of the electronic member, of transmitting the at least one identification information element via a radiofrequency signal transmitted during a time interval $\Delta T$ and then stopping the transmission of the radiofrequency signal at the end of said time interval $\Delta T$.

Here, the term "signal sensitive to the movement of the electronic member?" is taken to mean that either the amplitude of the signal is directly proportional to the movement or that the shape of the signal reflects an indirect information element concerning the movement of the electronic member. This movement is a translation in one direction and/or a rotation of the electronic member about an axis of rotation. By way of further explanation of the first case of the sensitivity of the sensor to movement, this may be, for example, the time response of an accelerometer along the radial direction with respect to an axis of rotation of the controlled electronic member by the square of the rotation velocity or of the direct change in the angular velocity supplied by a gyroscope sensor. In the second case, it may be, for example, the time variation of a rotary encoder.

Here, the term "signal sensitive to the distance of said sensor from an external object" is taken to mean either that the amplitude of the signal is directly proportional to the distance or that the shape of the signal reflects indirect information concerning the proximity of the electronic member to this object. This distance takes the form of an optical and/or audio and/or electromagnetic and/or mechanical signal.

Here, the term “microprocessor” is taken to mean an electronic device consisting of an electronic chip having elementary computing capacity, possibly an analogue/digital converter, according to the nature of the values supplied by the sensor. The microprocessor is coupled to a storage area, for performing operations on data for example. The microprocessor acts as an overall controller of the electronic member, by activating the various systems such as the movement-sensitive sensor or the proximity sensor, for example if these require energy in order to operate, and potentially, according to the intermediate results that it has obtained, by transmitting the identification information contained in the storage area of the electronic member at a given instant. In particular, it launches and times the radiofrequency transmission of the electronic member via the radiofrequency transmitter control. Finally, it is connected to an energy source in order to perform its tasks or those of components connected to it. This energy source, whether it is a battery or an energy accumulator such as a capacitance, supplied by an energy generating device such as a piezoelectric component, may also supply energy directly to the components linked to the microprocessor.

The term “predetermined change of state” is taken to mean one or more possible changes of state of the electronic member that have been specifically prepared for the performance of a task in the microprocessor linked to this change of state of the electronic member. Since the electronic member is classified according to p different states, there are $p^*(p-1)$ possible changes of state, taking into account the switching direction of the change of state. For example, if the electronic member is defined according to two states E0 and E1, there are two possible changes, namely the switch from E0 to E1 and the switch from E1 to E0. Some of these $p^*(p-1)$ possible changes of state are selected in order to draw up the list of predetermined changes of state. Only the changes of state on this list will result in an action by the microprocessor in terms of radiofrequency transmission of the identification information.

The electronic member responds to the requested functional requirements. To do this, it automatically transmits a radiofrequency signal if it detects a predetermined change of state of the electronic member for which it has been programmed. This change of state is manifested in the signal from the sensor, by the shape and potentially the amplitude, of this signal. Therefore the processing of this data signal enables the state of the electronic member to be determined in real time, even if the member is in motion. It also meets energy saving requirements by transmitting the radiofrequency signal only after a time interval $\Delta T$ following detection of the change of state of the electronic member. Therefore, in the case of private cars for example, it is usually in non-transmitting mode, so that it naturally saves energy by not transmitting a radiofrequency signal. Furthermore, it does not resume its transmission function until a new predetermined change of state has occurred. Finally, it is efficient in terms of transmission power, since the energy source provides it with all the transmission power that is necessary and available according to the transmission standards, by contrast with passive devices, in which only a part of the energy transmitted by the external reader and received by the passive device is used for radiofrequency transmission. The transmission of the signal is therefore optimized, and therefore covers a greater distance, making it possible to limit the number of receiving systems in a vehicle for example. Additionally, the on-board system in the vehicle is used only for reception, not for transmission, and also has a low energy consumption, by contrast with a solution using a passive electronic member. Thus it meets the constraints of competitiveness regarding the ecosystem of the electronic member.

Evidently, the time interval $\Delta T$ for the transmission of the radiofrequency signal may be defined according to the state of the electronic member at the moment of transmission. Thus this time interval $\Delta T$ may be identical for a plurality of states of the electronic member, or may be different for each state of the electronic member. This time interval may be programmed via wired or wireless means of communication between the electronic member and the programmer. By default, however, a standard value for this time interval $\Delta T$ is hard-wired into the electronic member.

Advantageously, the amplitude of the at least one part of the data signal constituting an information element for determining the state of the electronic member, each state of the electronic member being limited, in the at least one part of the data signal, by at least a first limit value, and the electronic member being in a given state, the crossing of the at least a first limit value by at least one value of the at least one part of the data signal characterizes the change of state of the electronic member.

Very advantageously, the at least a first limit value is a value defined on the basis of at least a critical distance or a critical velocity or a critical acceleration.

Since the microprocessor has intrinsic comparison means, it can detect the crossing of a first limit value or even the direction in which this first limit value is crossed. Depending on the nature of the sensor of the electronic member, there are two alternatives for characterizing the switch of the electronic member from one state to the other.

If the amplitude of the signal is the vector carrying the information on the movement or proximity of the electronic member, it is the crossing of the first limit value by the values of the data signal that characterizes the state of the electronic member. This first threshold, i.e. the first limit value, determines the switching of the electronic member to the next state. If the amplitude of the data signal is proportional to the velocity of the electronic member, the first limit value is the critical velocity. If the amplitude of the signal is a function of the velocity of the electronic member, such as, for example, the square of the rotation velocity in the case of acceleration in a direction radial to the axis of rotation, the first limit value proportional to the square of the critical velocity. However, in the case of proximity sensors, but not only in this case, the first limit value may be a function of a critical distance. Finally, the first limit value may also be a function of a critical acceleration. However, it is also possible to enter a standard value for this first limit value.

Advantageously, the repetition of a pattern in at least one part of the data signal constituting an information element for determining the state of the electronic member, and the electronic member being in a given state, the exceeding of a number N of patterns observed during a period $\Delta T'$ in the at least one part of the data signal characterizes a change of state of the electronic member.

Very advantageously, the period $\Delta T'$ is proportional to the inverse of a second critical velocity of the electronic member.

In the case of sensors for which the shape, but not the amplitude, of the signal indirectly reflects the movement of the mounted assembly or the proximity of the electronic member to another object, the switch to the next state corresponds to the reaching of a certain level of periodicity of the signal from the sensor. Thus, the duration ΔT' corresponds to this critical periodicity, for example in connection with a critical velocity, indicating the switch to the next state. The pseudo-periodicity of the data signal in this case makes it necessary, for example, to take the crossing of a threshold value into account. In particular, this threshold value must represent a degree of bijectivity, in order to identify the pattern in this way, for example as the response of an accelerometer mounted on an easily deformable object such as a wheel during rolling. If the direction in which this threshold value is crossed is also taken into account, a double detection in the period ΔT' illustrates the switch to the next state. If the direction of crossing is not taken into account, a triple detection within the period ΔT' will trigger the switch to the next state of the electronic member.

Additionally, the pattern does not necessarily have to be constant throughout the operation of the electronic member; a degree of transformation of this pattern as regards both its time variation and its amplitude may be tolerated, as long as its general shape remains identifiable.

Finally, the period ΔT' may well be a multiple of the second critical velocity which is a function of the periodicity of the pattern. However, it is preferable for this period to also be as short as possible, to allow rapid detection of the change of state of the electronic member without distortion due to an excessively fast variation of the movement of the electronic member or a fast approach of the electronic member to an external object. For example, if the period ΔT' is the critical periodicity, the detection of not more than one pattern during the period ΔT' in the data signal ensures that the member is below the critical periodicity and is therefore in a first given state. And conversely, the detection of at least two patterns during this same period ΔT' ensures that the member is above the critical periodicity. The electronic member is therefore in a second state.

In order to evaluate the change of state of the electronic member, the data signal from the sensor is observed for a period ΔT'. This period ΔT' usually indicates, in some applications, notably for movement detection, a periodicity of the electronic member, regardless of whether this is a period of rotation of a mounted assembly or of a rotating machine or is the period of a cycle of movement or action. Consequently, if a critical velocity corresponding to the switch to a certain level of periodicity of the electronic member is identified, then the period ΔT' would necessarily be determined, for example, by the ratio of the curvilinear distance generated by the electronic member during one rotation to the speed with which it is put into critical rotation. If, in this time period, the periodicity of the sensor signal is greater, then the electronic member has changed state, the change of state then being manifested as a modification of the periodicity of the electronic member.

Preferably, the at least one movement sensor is included in the group comprising inertial sensors, such as the accelerometer, the gyroscope sensor, the gyroscope, and angular sensors such as the rotary encoder and the magnetometer.

These sensors are all sensitive to the movement of the electronic member, regardless of whether this movement is translational or rotary, either via the shape of the signal as in the rotary encoder or the gyroscope, or via the amplitude of the signal as in the accelerometer or the gyroscope sensor. The accelerometer is a special case which is potentially sensitive to movement not only via its amplitude but also via its shape in the case where the accelerometer is mounted on a deformable rotating object such as a tyre casing.

Preferably, the at least one proximity sensor is included in the group comprising optical sensors such as photoelectric sensors or photoconductive cells or photodiodes, electromagnetic sensors such as Hall effect sensors, inductive sensors such as variable reluctance or Foucault current sensors, capacitive sensors, acoustic sensors such as ultrasonic sensors or microphones, microwave sensors and push buttons.

These sensors are all sensitive to the proximity of the electronic member to another object, regardless of whether this proximity is evaluated by light, electromagnetic waves or sound waves, or even contact between solids.

The specific periods for determining the change of state of the electronic member are either entered as a fixed value into the electronic member, with the specification of a limit value for each predetermined change of state, or evaluated by the processing of the at least one part of the data signal from the sensor. Evidently, the two limit values for the switch between two states and for the two directions of switching, from state "i" to state "j" and from state "j" to state "i", may be identical. However, it is also possible to define a specific limit value for each direction of switching.

In a preferred embodiment, the time interval ΔT for transmission of the radiofrequency signal is between 10 seconds and 10 minutes, or between 20 seconds and 10 minutes, or preferably between 30 seconds and 7 minutes or 5 minutes; very preferably, it is between 1 minute and 5 minutes.

One of the problem areas of an electronic member is its self-sufficiency in terms of energy. Furthermore, there is no need to transmit the identification information beyond the level that is just necessary. This is because radiofrequency transmission is an energy-intensive function of the electronic member. The electronic member has to perform its transmission function when the electronic member changes state, and when this direction of change of state requires a radiofrequency transmission. This justifies the presence of a transmission time interval which must be short. However, the electronic member is potentially in motion at the moment of its radiofrequency transmission. Moreover, the transmission may be interfered with by the external environment of the electronic member. Finally, the decision may also be made to orientate the radiofrequency transmission spatially by means of the antenna, which then becomes directional. This directional antenna may be movable or multiple in order to transmit in different geographical areas. The other benefit of directional antennas is the range of the radiofrequency transmission, which becomes longer. Consequently, for all of these options, a certain time interval must be specified, in order to ensure that the transmission of the identification information to the outside from the electronic member has taken place correctly. It has been found that a time interval of 20 seconds is a low limit and that it is more effective for this time interval to be at least 30 seconds or one minute in order to achieve high-quality radiofrequency communication, notably when the electronic member is in a dynamic state. This is because when the electronic member is in a dynamic state it requires a longer transmission time to overcome radiofrequency communication black spots, for example because the electronic member is put into motion. The best compromise found in the case of an application of the electronic member to the tyre of a land vehicle is a time interval of between 1 and 5 minutes, allowing enough redundancy of the information transmitted by radio waves at sufficient quality to ensure correct transmission of the identification information.

In a highly preferred embodiment, the transmission of the radiofrequency signal during the time interval ΔT takes place periodically over a period T which is preferably between 0.5 second and 1 minute.

Preferably, the period T is defined according to the state of the electronic member.

Thus the radiofrequency transmission is not continued. This makes it possible to save energy and improve the energy self-sufficiency of the electronic member, but becomes periodic. The periodicity may be a function of the rotation velocity of the electronic member. In the case of the mounted assembly, a periodicity of between 0.5 and 5 seconds is preferred for mounted assemblies for land or air vehicles. However, some states of the electronic member do not require such a periodicity, for example if the electronic member is in normal operation or at rest, that is to say without movement for example; in this case a periodicity of one minute is sufficient. Finally, the period T of transmission of the radiofrequency signal may also change according to the state of the electronic member. In this case, the periods associated with each state should be specified in the storage area of the electronic member. In particular, each state of the electronic member or predetermined change of state may result in a definition of the radiofrequency transmission time interval ΔT and the periodicity T of the radiofrequency signal.

Preferably, the radiofrequency signal has a transmission frequency of between 2400 and 2482 MHz.

This frequency band corresponds to that used by BLE (abbreviation for Bluetooth Low Emission) technology, which is a global communication standard for long-range transmission with minimal interference with the external environment, notably conductive materials. Additionally, communication antennas, in the case of dipole antennas for example, usually have a characteristic dimension proportional to the inverse of the communication frequency, as a result of which the antennas have small dimensions that facilitate the integration of the electronic member into many objects, particularly tyre casings.

The invention also relates to a second object, which is a tyre casing comprising an electronic member, having at least the technical characteristics of the first object of the invention, mounted integrally in said tyre casing, in which the at least one identification information element is included in the group comprising the serial number of the tyre casing, the identity of the tyre casing, the serial number of the electronic member and the identity of the electronic member.

The invention also relates to a third object, which is a conveyor belt comprising an electronic member having at least the technical characteristics of the first object of the invention, mounted integrally in said conveyor belt, in which the at least one identification information element is included in the group comprising the serial number of the conveyor belt, the identity of the conveyor belt, the serial number of the electronic member and the identity of the electronic member.

The invention also relates to a fourth object, which is a track, that is to say a flexible endless belt interposed between the ground and the wheels of a vehicle to provide traction on ground with a low grip coefficient, comprising an electronic member having at least the technical characteristics of the first object of the invention, mounted integrally in said track, in which the at least one identification information element is included in the group comprising the serial number of the track, the identity of the track, the serial number of the electronic member and the identity of the electronic member.

The invention also relates to a fifth object, which is a wheel comprising an electronic member having at least the technical characteristics of the first object of the invention, mounted integrally in said wheel, in which the at least one identification information element is included in the group comprising the serial number of the wheel, the identity of the wheel, the serial number of the electronic member and the identity of the electronic member.

Finally, the invention relates to a sixth object, which is a mounted assembly comprising an electronic member having at least the technical characteristics of the first object of the invention, mounted integrally in said mounted assembly, in which the at least one identification information element is included in the group comprising the serial number of the tyre casing, the identity of the tyre casing, the serial number of the wheel, the identity of the wheel, the serial number of the electronic member and the identity of the electronic member.

BRIEF DESCRIPTION OF THE DRAWINGS

The invention will be more readily understood from a reading of the following description, which mainly relates to an application of the mounted assembly type. These applications are provided solely by way of example and refer to the attached drawings, in which.

FIG. **3*a*** is a time signal emitted from a rotary encoder of an electronic member mounted on a tyre casing of a mounted assembly in a rolling condition according to the second object of the invention.

FIG. **3*b*** is a time signal emitted from a accelerometer of an electronic member mounted on a wheel of a mounted assembly in a rolling condition according to the fifth object of the invention.

FIG. **3*c*** is a time signal, representative of a proximity sensor, emitted from an accelerometer of an electronic member mounted on a mounted assembly in the proximity of an object, according to the fifth object of the invention.

FIG. **3*d*** is a time signal emitted from an accelerometer of an electronic member mounted on a tyre casing of a mounted assembly in a rolling condition according to the second object of the invention.

DETAILED DESCRIPTION OF EMBODIMENTS

Figure 1:
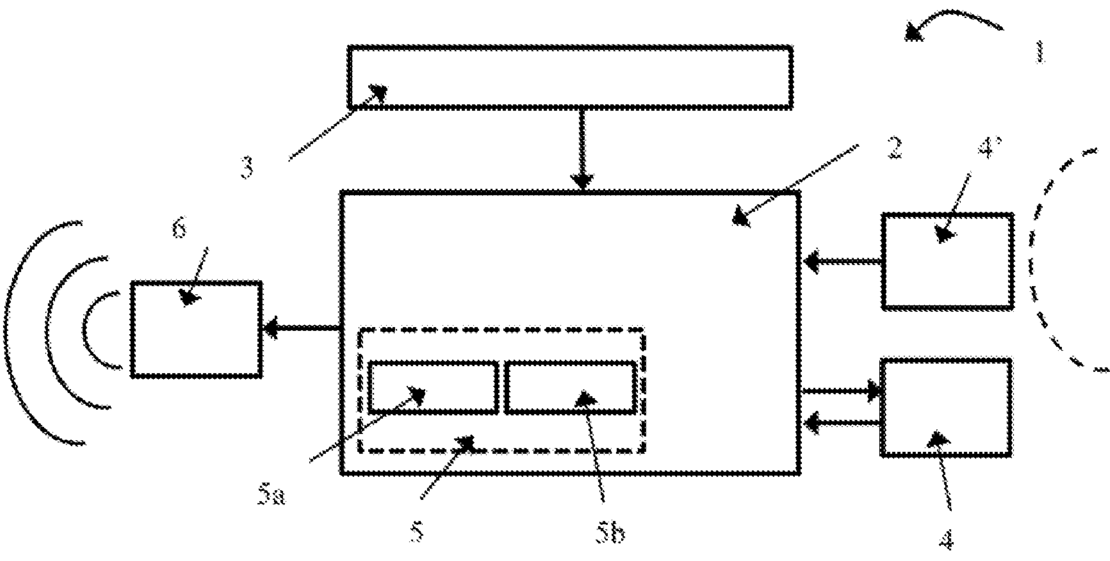
FIG. 1 is a simplified diagram of an electronic member according to one embodiment of the first object of the invention.

FIG. 1 shows a simplified diagram of an electronic member 1 according to the invention. This system comprises a microprocessor 2 coupled to an energy source 3 which may be a battery or an accumulator of energy which is, for example, supplied by a piezoelectric element. The microprocessor 2 is in communication with a movement sensor 4 sensitive to the movement of the electronic member, in this case the rotation speed about a predefined axis of rotation, which is the basis for the positioning and orientation of the movement sensor 4 with respect to the fixing support of the electronic member 1, not shown in this diagram. In this example, the microprocessor 2 controls the acquisition of the movement sensor 4 by transmitting the acquisition command to it, and retrieves the data obtained from the sensor 4. Similarly, the microprocessor 2 is linked to the mobility sensor 4' which in this case is an ultrasonic sensor sensitive to an ultrasound source emitting a calibrated noise. The emission of the source is represented here by a curved broken line. The link with this second sensor 4' is one-way in this case, because the sensor is passive. Additionally, the nearer the sensor 4', and therefore the electronic member 1, is to the ultrasound source, the stronger is the signal recorded by the sensor 4'. By analysing this signal it is possible to deduce the distance between the electronic member 1 and the ultrasound source.

The microprocessor 2 is connected to a first storage area 5*a* for storing some of the data obtained from the sensor, for the purpose of performing some of the above operations for defining the rotation state of the electronic member 1. Preferably, this storage area 5*a* is of the flash memory or RAM memory type. The microprocessor 2 may also be linked to a second storage area 5*b* containing the identification information carried by the electronic member 1, together with the predetermined changes of state. Preferably, this storage area 5*b* is a read-only memory, that is to say an EPROM or EEPRO memory that is locked for writing but possibly rewritable. The two storage areas 5*a* and 5*b* form the storage area 5 of the electronic member 1. However, if the microprocessor 2 has enough cache memory, the whole storage area 5 of the electronic member may be located in the microprocessor 2 in order to optimize the response times.

Finally, the microprocessor 2 is in communication with a radio transmitter 6 receiving the energy required for transmission, the identification information to be transmitted and, if necessary, the periodicity of transmission to be provided by the microprocessor 2. The radio transmitter 6 encodes the information in a radiofrequency signal and sends it via one or more transmitting antennas. Preferably, the radio transmitter 6 operates in the UHF (Ultra High Frequency) band, and particularly in the 2.4 GHz band, which is the working band of BLE technology. Evidently, the radio transmitter 6 may have a bidirectional link with the microprocessor, for the purpose of modifying the parameters of the electronic member, such as the identification information and the predetermined changes of state, according to the physical support on which the electronic member is to be integrally mounted. Thus, remote programming may be carried out either during or after the installation of the electronic member on the physical support, thereby facilitating the industrial production of physical supports fitted with such electronic members.

Figure 2:
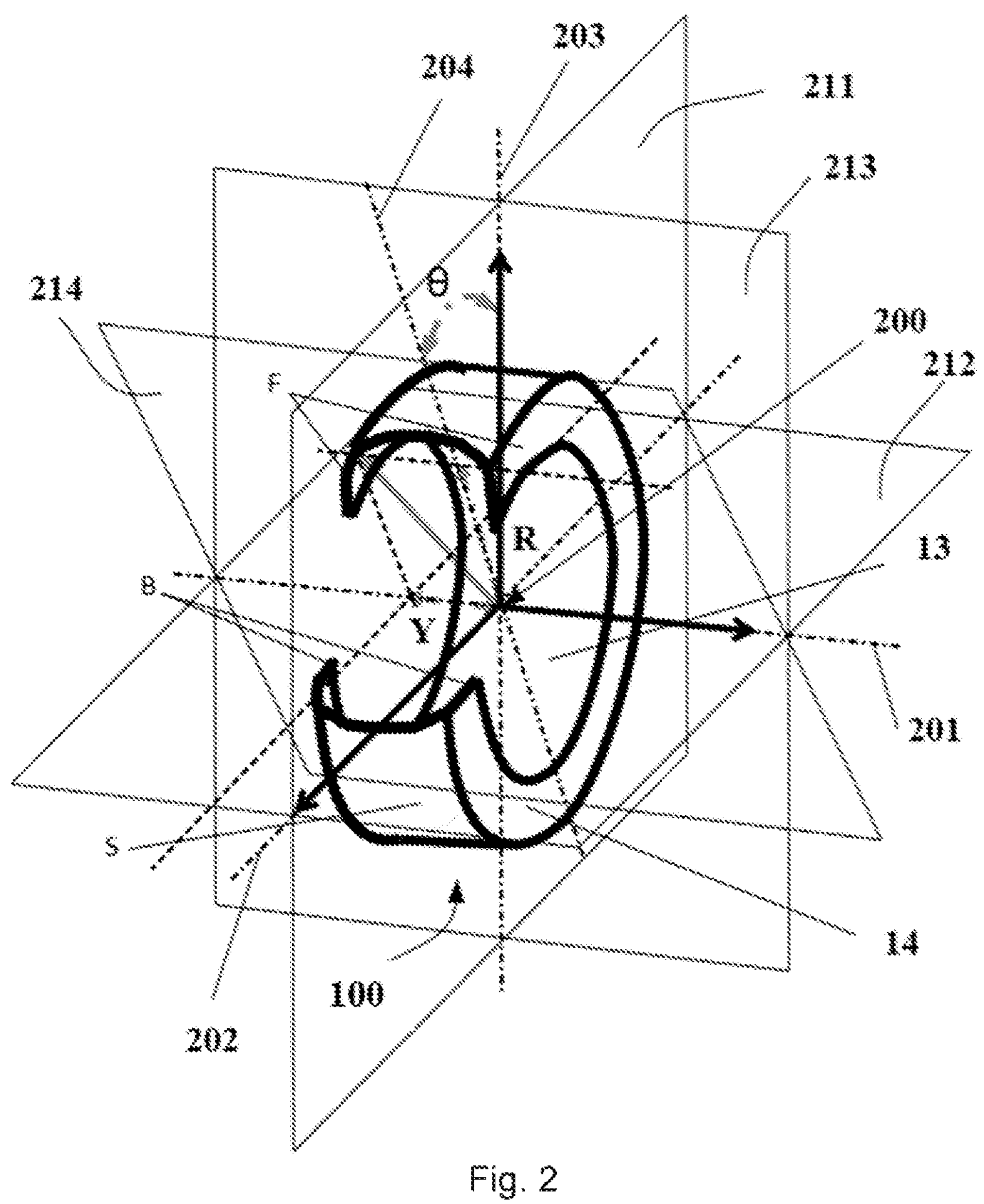
FIG. 2 is a mounted assembly comprising a tyre casing, fitted with an electronic member according to the second object of the invention, and a wheel.

FIG. 2 shows a section through a tyre casing 100 according to the second object of the invention. The tyre casing 100 comprises a crown S prolonged by two sidewalls F and terminating in two beads B. In this case, the tyre 100 is to be mounted on a private car or heavy goods vehicle wheel, which is not shown in this figure, at the position of the two beads B. Thus a closed cavity C, containing at least one pressurized fluid, is delimited, and is bounded by the inner surface 13 of the tyre casing 100 and the outer surface of the vehicle wheel. The outer surface of the tyre casing 100 is denoted 14.

The reference axis 201, corresponding to the natural axis of rotation of the tyre casing 100 or of the mounted assembly, should be noted, as should the mid-plane 211, perpendicular to the reference axis 201 and equidistant from the two beads B. The intersection of the reference axis 201 and the mid-plane 211 determines the centre of the tyre casing 200. A Cartesian reference frame in the centre of the tyre casing 200 is defined, consisting of the reference axis 201, a vertical axis 203 perpendicular to the ground, and a longitudinal axis 202 perpendicular to the other two axes. Furthermore, an axial plane 212 is defined that passes through the reference axis 201 and the longitudinal axis 202, parallel to the plane of the ground and perpendicular to the mid-plane 211. Lastly, the vertical plane 213 is the plane that is perpendicular both to the mid-plane 211 and to the axial plane 212 and that passes through the vertical axis 203.

Each material point of the tyre casing 100 is defined uniquely by its cylindrical coordinates (Y, R, θ). The scalar Y represents the axial distance to the centre of the tyre casing 200 in the direction of the reference axis 201 defined by the orthogonal projection of the material point of the tyre casing 100 on the reference axis 201. A radial plane 214 making an angle θ to the vertical plane 213 around the reference axis 201 is defined. The material point of the tyre casing 100 is referenced in this radial plane 214 by the distance R to the centre of the pneumatic tyre in the direction perpendicular to the reference axis 201 identified by the orthogonal projection of this material point on the radial axis 204.

The tyre casing 100 comprises, at a right angle to its crown S on the inner surface 13 of the tyre casing, an electronic member corresponding to the first object of the invention. The electronic member is fixed on the inner surface 13 of the tyre casing 100 by means of a patch of elastomer compound which is well known to those skilled in the art. The electronic member here comprises a sensor sensitive to movement, in the form of a single-axis accelerometer whose main axis is positioned perpendicularly to the inner surface 13 of the tyre casing 100. Thus the signal delivered by the sensor is the acceleration in the radial direction with respect to the natural axis of rotation 201 of the mounted assembly.

Evidently, the electronic member may also be fitted with a three-axis accelerometer whose axes are not collinear with each other. At this moment, it is entirely possible, given the geometrical position of these three axes with respect to the inner surface 13 of the tyre casing, to define the radial acceleration experienced by the electronic member. Therefore, it is useful to know the positioning of the electronic member with respect to the physical support, in this case the tyre casing 100, in order to deliver a useful signal. However, in the context of the determination of the movement of the electronic member, it is preferable but not essential to determine the radial acceleration. An error of inclination has no effect on the capacity of the electronic member to determine its state of rotation, but it is then necessary to adapt the detection parameters such as the first or second limit value. Similarly, it is preferable to position the electronic member at a right angle to the crown assembly S of the tyre casing 100. However, there is no reason why it should not be positioned on the sidewall F or the bead B of the tyre casing 100.

FIG. 3 are time representations of various sensors sensitive to the movement of the electronic member or its proximity to objects when it is made integral with the physical supports which are components of the mounted assembly, for example at the position of the wheel or the tyre casing.

Figure 3A:
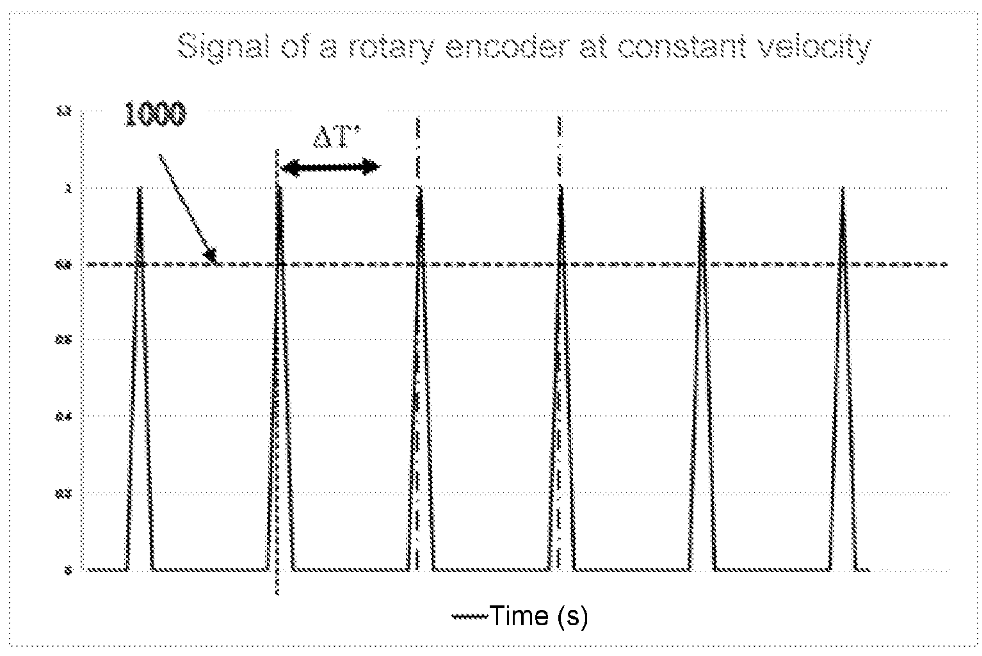

FIG. 3*a* is the time response of a rotary encoder of the electronic member mounted on a tyre casing during the rotation of the mounted assembly at constant velocity. The signal takes the form of a Dirac comb. Each Dirac represents a full rotation of the electronic member about the axis of rotation of the tyre casing. This data signal is bounded by the unit value. The critical periodicity for identifying a predetermined change of state of the tyre casing is represented here by the time interval ΔT' which starts in temporal terms at the level of the Dirac. For the signal analysis, a threshold value of 0.8 has been defined, the upward crossing of this threshold value being taken as the starting point of the timebase of the time interval ΔT'.

In order to constitute a change of state of the electronic member and therefore of the tyre casing, that is to say a change of rotation speed, the pattern of the wheel revolution signal must be repeated at least once in the period ΔT'. Here, the identification of the pattern requires the detection of the threshold value, which is a bijective value represented by the horizontal curve 1000 shown as a broken line. Additionally, given the direction in which the threshold value of 0.8 is crossed, it must be crossed twice in the period ΔT' to determine a change of state of the electronic member mounted integrally on the tyre casing. If there is no direction of crossing, the threshold value would have to be crossed three times. This is not the case here, because only a single upward crossing is observed. The electronic member, and therefore the tyre casing does not change its state, and therefore the electronic member does not trigger the radiofrequency transmission.

Figure 3B:
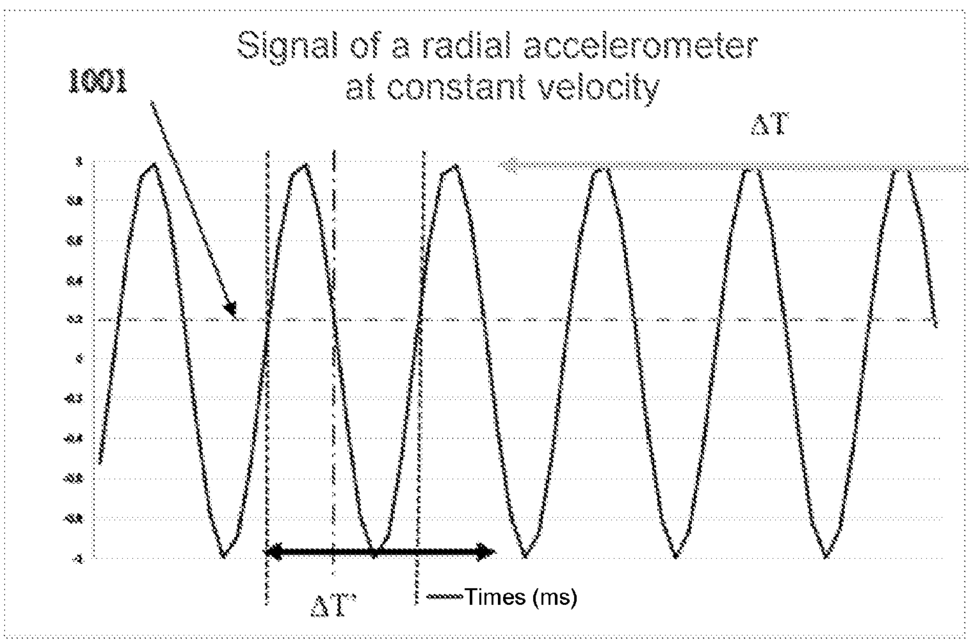

FIG. 3*b* corresponds to the time data signal of an electronic member mounted on a wheel of a mounted assembly. Said mounted assembly is in a condition of rolling at constant velocity. Here, the data signal is representative of the signal of an accelerometer in the radial direction of the mounted assembly with respect to the natural axis of rotation of the mounted assembly.

The determination of the change of state of the electronic member, and therefore the change of state of the object, in this case the mounted assembly, on which the electronic member is integrally mounted, may be carried out via the amplitude of the values of the data signal and also simply via the shape of the data signal, because of the effect of terrestrial gravity on the amplitude of the signal. In fact, during one rotation of the mounted assembly, the extreme vertical positions represent the minima and maxima of amplitude of the radial acceleration, enabling revolutions of wheels to be detected. Conversely, the vertical median positions of the accelerometer during the wheel revolution represent the central values of the signal between the minima and maxima. Evidently, if the radial acceleration of the mounted assembly is not constant, the signal is perturbed by a carrier linked to the instantaneous radial acceleration of the electronic member.

Taking into account the fact that the rotation speed is constant here, a time interval ΔT' corresponding to the switch to a particular state of rotation of the electronic member is determined. This time interval ΔT' starts from a reference point; here, the reference point is the threshold value 0.2 of the sinusoidal signal of the radial acceleration subtracted from the carrier linked to the rotation velocity of the mounted assembly. The threshold value is represented by the broken horizontal curve 1001. The upward crossing of the value 0.2 increments an encoder. If the encoder exceeds the number 2 during the period ΔT', this signifies a change of state of the electronic member. Here, this event does indeed occur during the period ΔT'. At the end of the time interval ΔT', the electronic member starts to transmit a radiofrequency signal at a time interval ΔT. This radiofrequency signal comprises an identification information which in this case is the serial number of the tyre casing and the serial number of the wheel, which were previously put into the storage area of the electronic member during the formation of the mounted assembly.

Figure 3C:
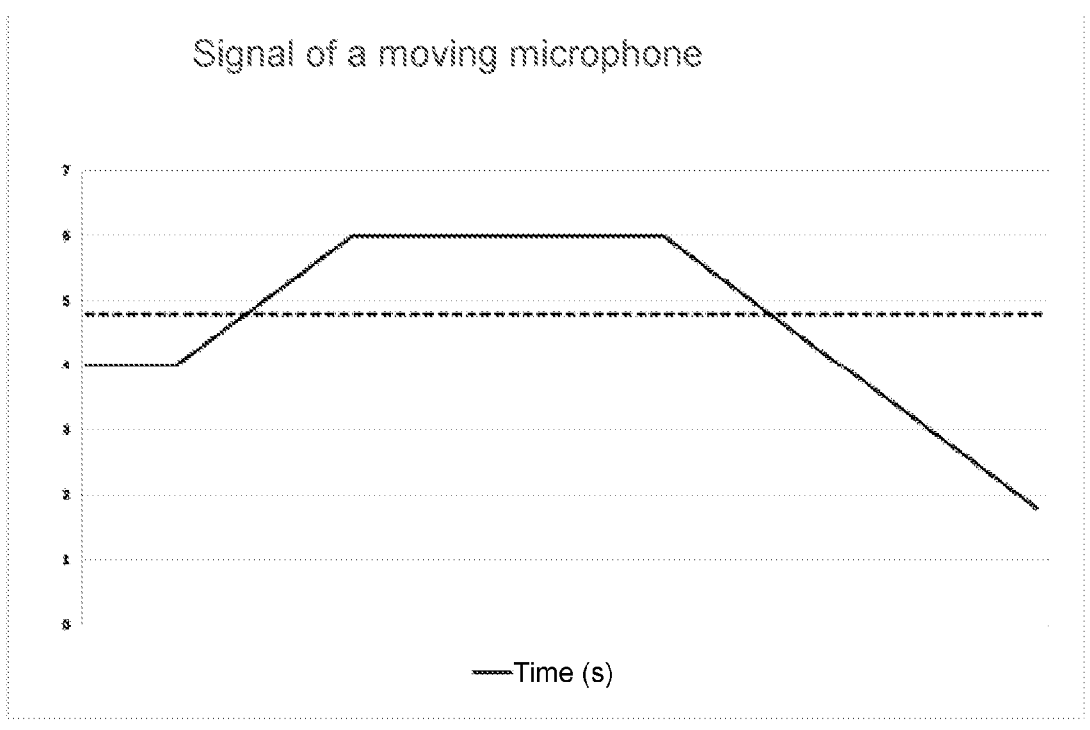

FIG. 3*c* is the time response of the data signal of the electronic member representative of a microphone. The electronic member is initially positioned with respect to an object which is a source of white noise. The electronic member is mounted on a mounted assembly. The source of white noise is moved transversely with respect to the mounted assembly in a manner transverse to the latter, and a stop in this transverse movement is marked. Starting from a stop position, the noise source is brought towards the mounted assembly. The stop time is marked, and the noise source is then moved away from the electronic member along the same path, separating it from the mounted assembly. Here, the separation is greater than the initial distance between the noise source and the mounted assembly.

The aim here is to determine changes between two states of the electronic member corresponding to the distance from this electronic member to the noise source.

The first state correspond to a distance greater than a critical length LO, and the second state corresponds to a distance smaller than the same critical length. A calibration of the proximity sensor, represented by the microphone, to determine that the critical distance LO corresponds to a certain amplitude of the data signal representative of the microphone must be done. This amplitude is represented by the broken horizontal curve 1002 which forms a first limit value. Additionally, in this case, the simple detection of the first limit value is not sufficient to initiate the radiofrequency transmission. This transmission is subject to a delay effect. In fact, the signal must exceed the first limit value for a period ΔT". This provides greater certainty that the critical length has been exceeded, by redundancy of information. Given that the change of state of the member between state 1 and state 2 has taken place and that this change is a predetermined change of state, the electronic member initiates the radiofrequency transmission for a time interval ΔT.

The electronic member then detects the downward crossing of the first limit value, which in this case potentially corresponds to the switching of the electronic member from state 2 to state 1. In fact, this change of state must persist for a period ΔT'" in order to validate this change of state of the electronic member. However, this change of state from state 2 to state 1 is not a predetermined change of state. Therefore, although the change of state persists, the electronic member does not transmit a radiofrequency signal. However, it is now in state 1. It waits for a return to state 2 and the necessary conditions for transmitting a radiofrequency signal carrying identification information about the mounted assembly during the same time interval ΔT.

Figure 3D:
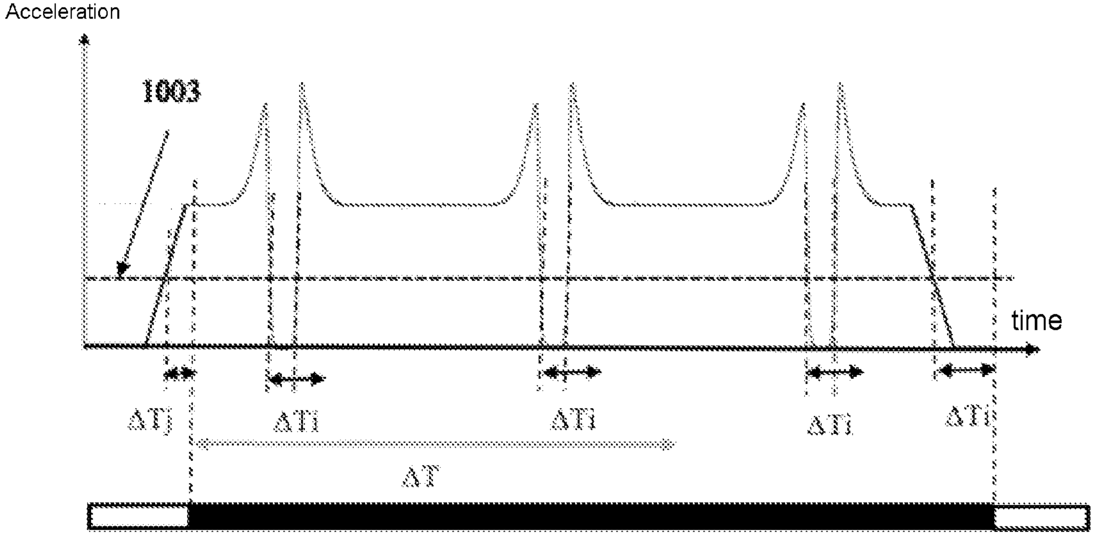

FIG. 3*d* is a time signal emitted from an accelerometer of an electronic member mounted on a tyre casing of a mounted assembly in a rolling condition. Here, the aim is to identify the state of the electronic member between a first state 1 and a second state 2 corresponding to a velocity of movement of the electronic member above a critical velocity. This critical velocity is represented in terms of acceleration along the radial direction by a first limit value which is proportional to the square of the critical velocity. This first limit value is represented by the broken horizontal curve 1003.

At the start of the temporal variation, the electronic member is in its state 1, the amplitude of the accelerometer signal being below the curve 1003. The acceleration then upwardly crosses the value defined by the curve 1003. This is confirmed after a delay ΔTj; that is to say, after this period the amplitude of the signal is still above the curve 1003, which signifies that the electronic member has changed its state and switched to state 2. Since this change of state is a predetermined change of state for the electronic member, the latter starts to transmit a radiofrequency signal comprising the identification information of the tyre casing after the delay ΔTj. This transmission takes place during the time interval ΔT, via a signal transmitted periodically during this time interval ΔT. The electronic member then stops its radiofrequency transmission. During this time, however, the amplitude of the data signal crosses the curve 1003 downwardly, before crossing it upwardly again. This dip in the data signal is specific to the tyre casing in the rolling condition. This is because, when the accelerometer of the electronic member is in the contact area, corresponding to the material point of the tyre casing in contact with the ground, the accelerometer observes an acceleration of virtually zero, due to this contact. This transient switch lasts for only a part of the wheel revolution of the tyre casing, not exceeding 10% of this wheel revolution. In temporal terms, this switch of the accelerometer to a virtually zero value continues for a short period which is a function of the velocity of the tyre casing. To avoid misleading the electronic member about its state, it is useful, for example, to define a second delay ΔTi which is a function of the critical velocity and the characteristics of the tyre casing, in order to prevent the electronic member from making an untimely and erroneous decision because it considers that the electronic member has returned to state 1. The electronic member re-analyses the amplitude of the data signal after this delay ΔTi. If this value is again above the curve 1003, this means that the electronic member is still in its initial state, that is to say its state 2. If it detects that the amplitude of the signal is still below the curve 1003, it deduces that the electronic member has switched to its state 1. Here, the switch from state 2 to state 1 is not a predetermined change of state of the electronic member, and the latter does not start to transmit a radiofrequency signal. However, it is now in state 1. The duration of state 1 of the electronic member attached to the tyre casing is indicated by the white rectangle, and the duration of state 2 is indicated by the black rectangle.

The invention claimed is:

1. An electronic member incorporated in a mounted assembly, the electronic member comprising:

at least one movement sensor, a signal of which is sensitive to movement of the electronic member, or at least one proximity sensor, a signal of which is sensitive to a distance of the at least one proximity sensor from an object outside the electronic member;

a microprocessor coupled to the at least one movement sensor or to the at least one proximity sensor to create a data signal;

a storage area connected to the microprocessor for storing at least one part of a data signal representative of the at least one movement sensor or the at least one proximity sensor and at least one identification information element;

an energy source; and a radio transmitter connected to the microprocessor, wherein the microprocessor defines at least two states of the electronic member based on the at least one part of the data signal, wherein the storage area contains at least one predetermined change of state which is defined on a basis of the at least two states of the electronic member, the predetermined change in state indicated by at least one of:

(1) a change of a rotation speed of the mounted assembly above or below a threshold value for the rotation speed, wherein the threshold value for the rotation speed does not indicate a change in state of the electronic member if only a single crossing of the threshold value is observed;

(2) a change in a periodic radial acceleration above a critical acceleration, the periodic radial acceleration corresponding to a rotation velocity of the mounted assembly, wherein the data signal has an acceleration part, and an amplitude of the acceleration part is a function of the rotation velocity;

(3) a change in distance corresponding to the electronic member crossing a critical length threshold for a critical length, the critical length being between the electronic member and the object; and (4) a change in velocity of the mounted assembly above a critical velocity, the change in velocity represented by an amplitude of an accelerometer first being below a curve corresponding to the critical velocity and then upwardly crossing the curve corresponding to the critical velocity, wherein the microprocessor, after detecting the at least one predetermined change of state of the electronic member, causes the radio transmitter to transmit the at least one identification information element via a radiofrequency signal transmitted during a time interval ΔT beginning after detecting the at least one predetermined change of state of the electronic member, and stops transmission of the radiofrequency signal at an end of the time interval ΔT, the time interval ΔT of the transmission of the radiofrequency signal ending after between 20 seconds and 10 minutes, and wherein the radiofrequency signal has a transmission frequency of between 2400 and 2482 MHz.

2. The electronic member according to claim 1, wherein, an amplitude of the at least one part of the data signal constituting an information element for determining a state of the electronic member, each state of the electronic member being limited, in the at least one part of the data signal, by at least a first limit value, and the electronic member being in a given state, the crossing of the at least a first limit value by at least one value of the at least one part of the data signal characterizes the change of state of the electronic member.

3. The electronic member according to claim 2, wherein the at least a first limit value is a value defined on a basis of at least the critical distance, critical velocity, or the critical acceleration.

4. The electronic member according to claim 1, wherein, repetition of a pattern in the at least one part of the data signal constituting an information element for determining a state of the electronic member, and the electronic member being in a given state, exceeding a number N of patterns observed during a period ΔT' in the at least one part of the data signal characterizes a change of state of the electronic member.

5. The electronic member according to claim 4, wherein the period ΔT' is proportional to an inverse of a second critical velocity of the electronic member.

6. The electronic member according to claim 1, wherein the at least one movement sensor is selected from the group consisting of inertial sensors and angular sensors.

7. The electronic member according to claim 1, wherein the at least one proximity sensor is selected from the group consisting of optical sensors, electromagnetic sensors, inductive sensors, capacitive sensors, acoustic sensors, microwave sensors and push buttons.

8. The electronic member according to claim 1, wherein transmission of the radiofrequency signal during the time interval ΔT takes place periodically over a period T, the period T being between 0.5 seconds and 1 minute.

9. The electronic member according to claim 8, wherein the period Tis defined according to a state of the electronic member.

10. A tire casing comprising the electronic member according to claim 1 mounted integrally on the tire casing, wherein the at least one identification information element is selected from the group consisting of a serial number of the tire casing, an identity of the tire casing, a serial number of the electronic member, and an identity of the electronic member.

11. A conveyor belt comprising the electronic member according to claim 1 mounted integrally on the conveyor belt, wherein the at least one identification information element is selected from the group consisting of a serial number of the conveyor belt, an identity of the conveyor belt, a serial number of the electronic member, and an identity of the electronic member.

12. A track comprising the electronic member according to claim 1 mounted integrally on the track, wherein the at least one identification information element is selected from the group consisting of a serial number of the track, an identity of the track, a serial number of the electronic member, and an identity of the electronic member.

* * * * *